United States Patent [19]

Ahlen

[11] 3,944,034

[45] Mar. 16, 1976

[54] VEHICLE TRANSMISSION WITH MULTIPLE TORQUE CONVERTORS

[75] Inventor: Karl Gustav Ahlen, Stockholm, Sweden

[73] Assignee: S.R.M. Hydromekanik Aktiebolag, Sweden

[22] Filed: Nov. 5, 1973

[21] Appl. No.: 412,638

[30] Foreign Application Priority Data
Nov. 3, 1972 United Kingdom.............. 50904/72
Mar. 5, 1973 United Kingdom.............. 10532/73

[52] U.S. Cl. ............. 192/3.25; 192/3.26; 192/3.27; 60/363; 74/718; 74/730
[51] Int. Cl.² .................... F16H 47/08; F16H 41/22
[58] Field of Search ....... 192/3.25, 3.26, 3.27, 3.32; 60/363; 74/718

[56] References Cited
UNITED STATES PATENTS

| | | | |
|---|---|---|---|
| 2,063,471 | 12/1936 | Stedefeld ....................... | 192/3.25 X |
| 2,213,349 | 9/1940 | Siebold ......................... | 192/3.25 X |
| 3,270,587 | 9/1966 | Geray ............................ | 74/718 X |
| 3,377,876 | 4/1968 | Finke et al...................... | 74/718 X |
| 3,463,033 | 8/1969 | Fisher .......................... | 192/3.26 X |
| 3,839,864 | 10/1974 | Ahlen ........................... | 60/349 |

*Primary Examiner*—Benjamin W. Wyche
*Attorney, Agent, or Firm*—Larson, Taylor and Hinds

[57] ABSTRACT

The invention described in this specification relates to a hydrodynamic torque converter transmission of the type including two or more torque converter units connected in parallel between the input and output shafts and provided with means for interrupting the torque transfer through one or more of said units. One or more torque converters in the transmission is or are arranged with one bladed component thereof such as the pump or turbine blades selectively releasable from or engageable with an input shaft or an output shaft respectively whereby different driving conditions are obtained by engaging and disengaging the drive through different torque converters.

26 Claims, 10 Drawing Figures

VEHICLE TRANSMISSION WITH MULTIPLE TORQUE CONVERTORS

This invention relates to hydrodynamic torque converter transmissions of the type including two or more torque converter units connected in parallel between the input and output shafts and provided with means for interrupting the torque transfer through one or more of said units.

Torque converter transmissions of the above type are well known. Normally, engagement or disengagement of the drive through one or other of the converter units has been effected by filling or emptying respectively, the working chamber of the torque converter. Alternatively, the use of friction clutches for the above purpose has also been proposed.

The main disadvantage of the filling and emtpying system is the difficulty in controlling the filling and emtpying periods to ensure they do not overlap. Another serious disadvantage is that on emptying the converter chamber of oil the torque converter may still remain operative with the air present in the chamber, which, under certain driving conditions may be sufficient to necessitate the cooling of the interior of the empty converter chamber. Moreover, the power absorption due to the air acting as the working fluid is sufficiently high to reduce substantially the overall efficiency of the transmission.

If friction clutches are used for the engagement or interruption of the torque transfer these may be of either the wet or dry type. Wet clutches produce considerable drag torque due to the large friction surface necessary, and this in turn, leads to the necessity of using multiple disc clutches. In the case of dry clutches the mechanical arrangement thereof has been both complicated and costly and results in a large size of the overall unit.

For the above reasons this type of unit has been used mainly as transmissions in railway service and mostly for shunting locomotives though also for mixed service and line locomotives. Otherwise they have not been used for other types of vehicles.

One reason for such limited use is that a filling and emptying arrangement needs a large space which means that such transmissions are of large dimensions and heavy, which has been acceptable only in the railway field. The dimensions of the unit are very important for buses and trucks and for earth moving equipment and also in connection with gas turbines and therefore combinations of transmissions with dry friction couplings have not been seriously considered while transmissions utilising wet friction couplings have not been acceptable due to the losses being too high.

According to the invention in a torque converter transmission of the type referred to above, one or more torque converters are arranged with one bladed component thereof, such as the pump or turbine selectively releasable from or engageable with respectively an input shaft or an output shaft. This allows different driving conditions to be obtained by engaging and disengaging the drive through different torque converters.

This is particularly true in the case of an arrangement where the turbine is released from the turbine shaft and particularly if the arrangement of the releasable turbine conforms to that described in my prior copending U.S. Patent Application Ser. No. 348,191, filed Apr. 6, 1973, now U.S. Pat. No. 3,839,864.

While to a high degree the requirement of low drag torque is obtained, a further result is the provision of an arrangement for the release and engagement of torque transfer which can be effected with high frequency without resultant destruction of friction surfaces and with the primary shaft of the converter at maximum speed and the secondary shaft thereof at stall also without destruction of friction surfaces. Not only is this result obtained, but at the same time no connection shocks are obtained since when connecting the turbine or the pump to its driving or driven source, the torque transportation results from starting the fluid circulation in the torque converter, and can not exceed normal torque transportation for the speed ratio between the primary and the secondary sides of the torque converter.

According to a further feature of the invention the torque converters arre connected between the input and output shafts by gears adapted to give each torque converter a working range of its own with or without a power absorption capacity of its own different from the absorption capacity of other torque converters of the transmission.

A further feature of the invention resides in the torque converter part of the transmission being combined with different forms of gearing such as a forward-reverse gear or a multiple speed gear, or both, the said gears being dependent for their connections or disconnections on the characteristics of the particular torque converters used.

In one arrangement of the invention different torque converters are utilised for driving the output shaft in opposite directions. In another arrangement, torque converters having different specific torques operate in parallel within the same speed range, allowing absorption and part load at the same input speed so that either one or another or a combination of two or more torque converters can be connected step by step.

Preferably, the torque converter transmission includes an arrangement comprising an assembly of four torque converters supported in diametrically opposed pairs around coaxial primary and secondary shafts with the central axes of the converters parallel to each other and means for selectively and respectively coupling together the said primary and secondary shafts with the diametrically opposed pairs of torque converters.

The invention will be hereinafter more fully described by way of example with reference to the embodiments thereof illustrated in the accompanying drawings in which:-

Figure 1:
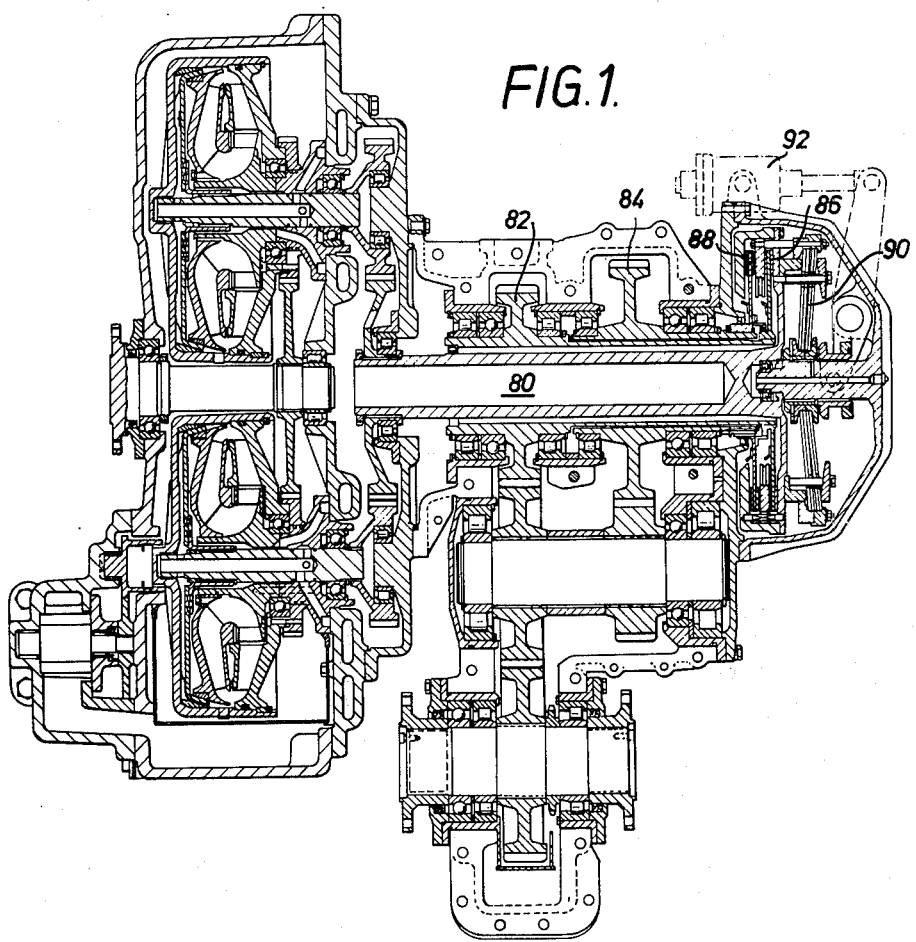
FIGS. 1, 3, 5 and 8 show longitudinal axial sections of four forms of the transmission of the invention each taken through a plane corresponding to the line A–B–C–D–E of FIG. 10.

As referred to above, the transmission includes a plurality of torque converters co-operating through mechanical gearing wherein the pump or turbine element is releasable from and engageable with the driving or driven members respectively to enable different driving conditions to be obtained by engaging or disengaging the driving line through different torque converters. A releasable pump arrangement is shown in my copending U.S. Application Ser. No. 262,514, now U.S. Pat. No. 3,893,551.

This principle is illustrated in each of the forms of transmission shown in the drawings but the particular gear combination employed provides features making the transmissions suitable for different applications.

Figure 3:
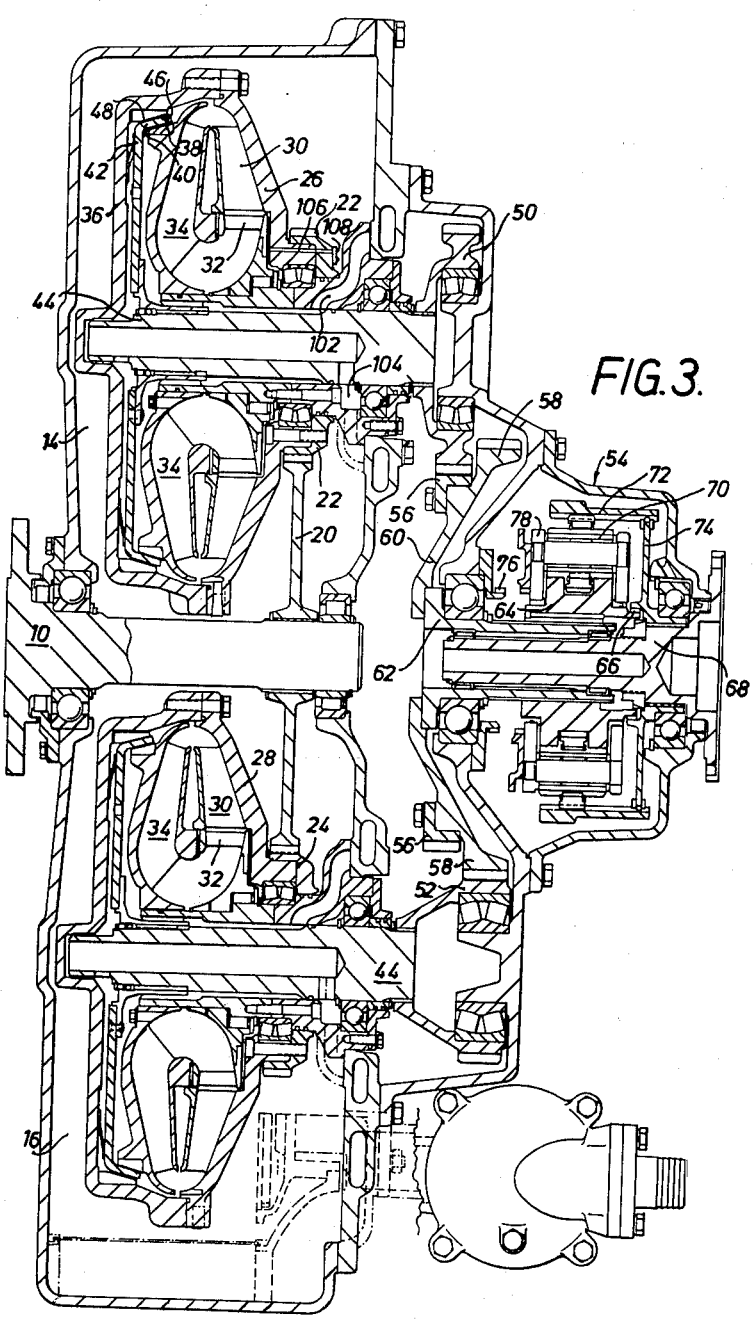
Figure 10:
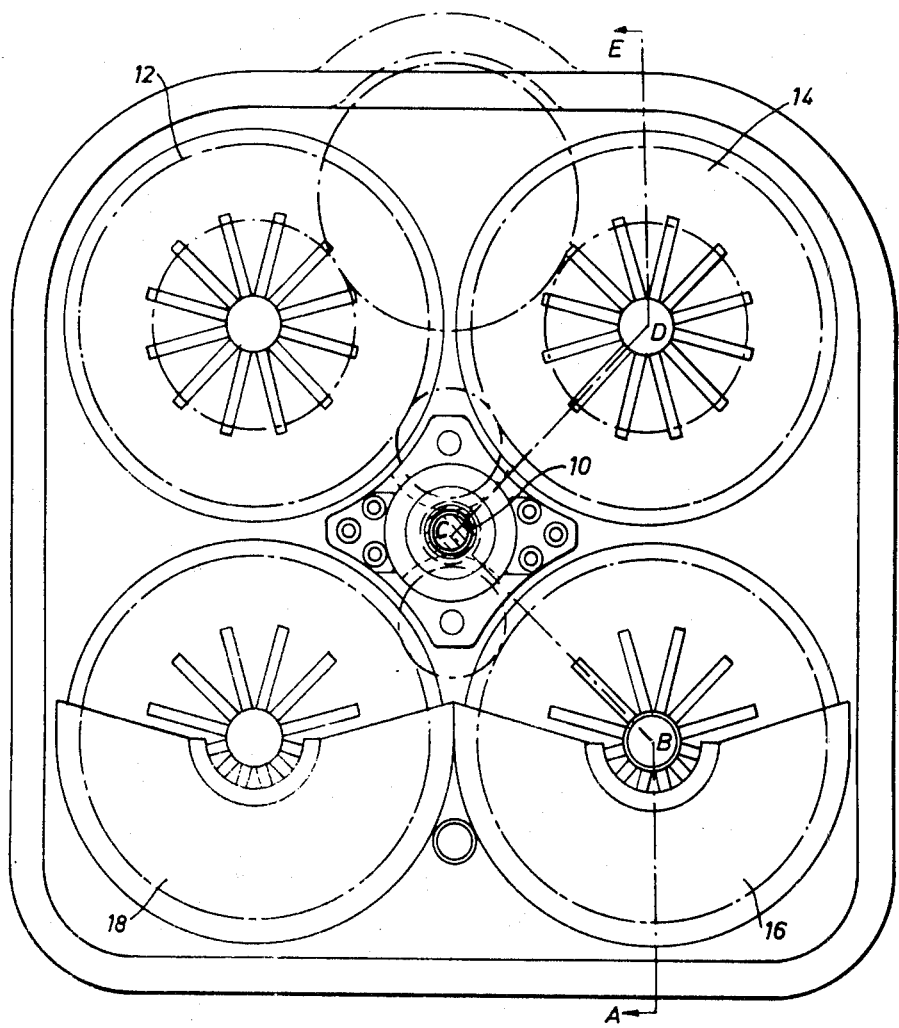
FIG. 10 is an end view transverse to the axis of the transmission in diagrammatic form.

The construction of FIG. 3 will be described now in detail, it being understood that the majority of the features of the torque converters shown in FIG. 3 are also present in the constructions shown in FIGS. 1, 5 and 8. Referring to FIGS. 3 and 10 a driving shaft 10 is arranged centrally of an assembly of four torque converters 12, 14, 16, 18 which are supported in diametrically opposed pairs around the shaft 10 in such manner that the central axes of the converters are parallel to one another and to the shaft 10. FIG. 3 also represents a 2-unit arrangement.

Shaft 10 carries a gear 20 which meshes with gears 22, 24 mounted on the rotating casings 26, 28 of the converters 14, 16, each casing carrying a pump member 30. Each casing also encloses reaction blades 32 and a turbine member 34, the outer wall 36 carrying the turbine blading being provided with a part conical friction surface 38 adapted to be contacted by an inclined rim 40 of a dished friction plate 42 axially displaceably mounted on an output shaft 44.

The turbine blading may thus be disengaged from the output shaft 44 by outward axial displacement of the friction plate 42. The latter may be displaced outwardly sufficiently far to engage by its outer face 46 a friction surface 48 formed on the rotating casing 26 to provide direct drive between the rotating casing and the output shaft 44. This form of release of the turbine blading from the output shaft is fully described in the patent referred to above.

The output shafts 44 of the converters 14, 16 carry a pinion 50, 52 respectively which mesh with gears of a two speed gear box denoted generally by 54. Since the converters 14, 16 are members of different diametrically opposed pairs the pinions 50, 52 are of different sizes and mesh with different gear elements 56, 58 of the gearing 54 carried by the same disc 60 mounted on the input shaft 62 of the gearing 54.

The shaft 62 carries a gear member 64 provided with a toothed coupling 66 coupling the same to an output shaft 68. The gear 64 also cooperates with a sun and planet gearing 70 which meshes with a gear 72 carried by the disc 74 formed with one element of the coupling 66. Axial displacement of the gear member 64 to the left disconnects coupling 66 and further axial displacement causes engagement of a dog clutch 76 which holds the carrier 78 of the sun wheel stationary and provides a reverse gear.

The torque converter as described in FIG. 3 is especially suitable for railcar applications owing to the positive disconnection of the plate 42 by means of oil entering through channel 102 to separate the turbine 34 from the disc 42 and thereafter passing between the friction surface 38. Fluid also enters through channel 104 and passes between the rotating casing 26 and the disc 42 as well as between the friction surfaces 48, thereby guaranteeing that no metallic contact exists between adjacent components. Further, pressure fluid entering through the channels 102 and 104 leaves through a vent hole 106 covered by a maximum pressure valve 108 and, because the turbine shaft and the disc are smooth, they produce low ventilation losses when they rotate in the oil. This allows a very high differential speed to be reached between the turbine shaft and the disc (such as, for instance, required in the arrangement according to FIG. 1) without giving excessive ventilation losses. In FIG. 3, when any torque converter is released, the turbine shaft rotates in the opposite direction from the rotating casing at a speed which is equal to the speed of the forwardly rotating turbine, when the torque converter is connected.

Further, this type of torque converter is a part of the basis for the invention, because the lock-up clutch does not need to be connected for reaching the same top speed of the vehicle as with the lock-up clutch, that is, when the engine is allowed to reach a 10% higher speed.

The high release capacity of this type of torque converter arrangement possesses the feature that shift of complementary gears can be carried out without torque transportation by exerting only a synchronizing torque. Alternatively, a reverse dog clutch can be shifted without risk of obtaining rotation between the parts to be connected because for a short time there is no driving connection in the forward or the reverse direction, when the clutch sleeve is passing from one clutch connection to another.

Another feature of the combination of torque converters according to the invention and depending on the torque converter type used is that, when connecting the turbine to the output shaft, a small mass is brought to synchronization with the output shaft. The turbine then actuates the circulation of fluid, thus raising the torque transportation which gives the arrangement of the torque converters according to the invention an exceptional feature of smooth shifts between different gear ratios.

The transmission shown in FIG. 3 is particularly suitable for a railcar since it provides an entirely smooth change of drive from one speed to another by connecting one or the other of the two torque converters, or if a 4- torque converter arrangement is used, couples of two, giving the same maximum speed, while at the same time providing a ready solution of the shift of a dog clutch from forward to reverse which is normally a big problem for a transmission having a rotating casing.

Figure 4:
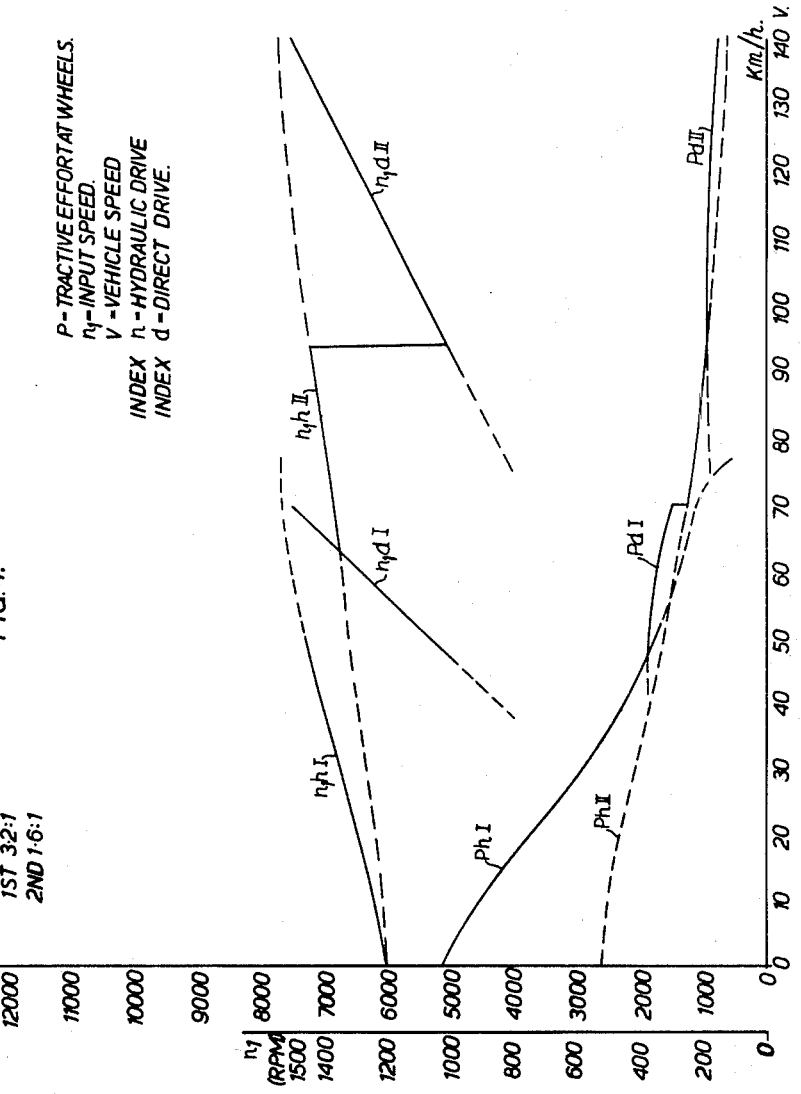

The graph shown in FIG. 4 indicates the results obtained by the use of the two converters of the S.R.M. 2DF 0.9 type geared for different top speeds cooperating with an engine of 480 h.p. 1500 r.p.m. and followed by a reverse gear suitable for a railcar.

Figure 2:
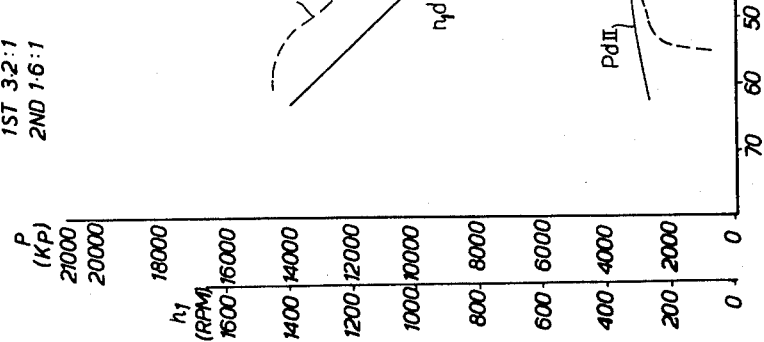
FIGS. 2, 4, 6, 7 and 9 show graphical representations of the specific performance of the four transmissions.

The transmission shown in FIG. 1 is an advanced type for a shunting and mixed service locomotive transmission having a wide speed range. In this case the input shaft 80 of a two speed gear is coupled to one or other of two gears 82, 84 by means of friction couplings 86, 88, the coupling 86 or 88 being rendered operative by an overcentre spring 90 and the overcentred spring system 90 being put in position for connection of coupling 88 or 86 by means of a servomotor 92 and associated linkage. By this arrangement it is possible to use the torque converter for braking the vehicle speed by changing over from one of the torque converters to the other torque converter, even at the highest speed. Even the couplings 88 and 86 connecting high and low speeds can be connected or disconnected by the servomotor 92 through drive, whereby, however, both torque converters should be disconnecting, e.g. the turbine and the direct drive before changing the connection between the friction discs. This may be effected with a delay of less than 0.2 second and without submitting any part of the transmission to overstress or producing slipping of the driving wheels of the vehicle as will be seen from the curves indicating the tractive effort shown in FIG. 2.

In this Figure are shown the performance characteristics for a shunting and mixed service locomotive wherein the engine was of 720 h.p. at 1400 r.p.m. and the converters were 2 S.R.M. DFf 1.0 Ms 84 followed by the two speed gear. The gear ratios were 3.2 to 1 and 1.6 to 1 respectively.

Figure 5:
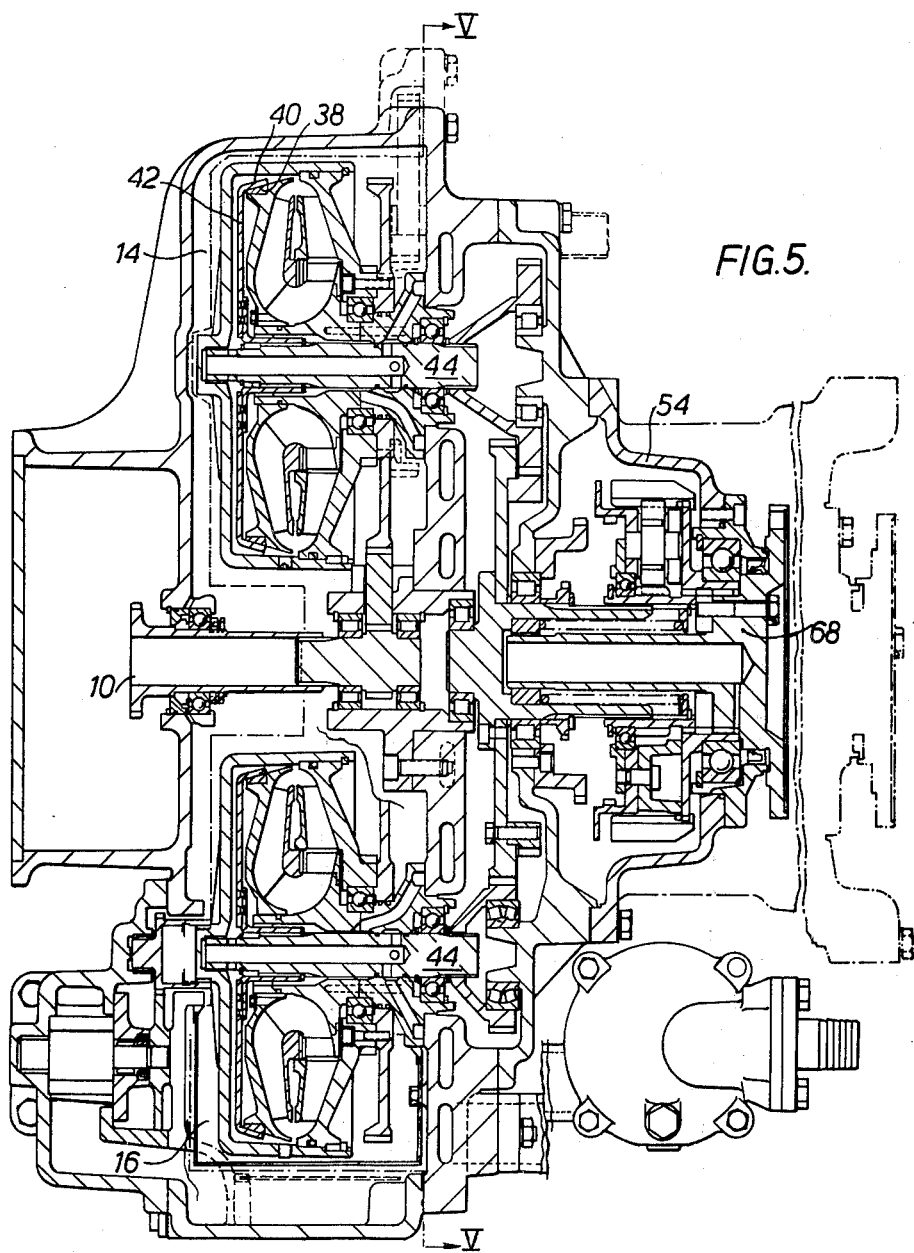
Figure 6:
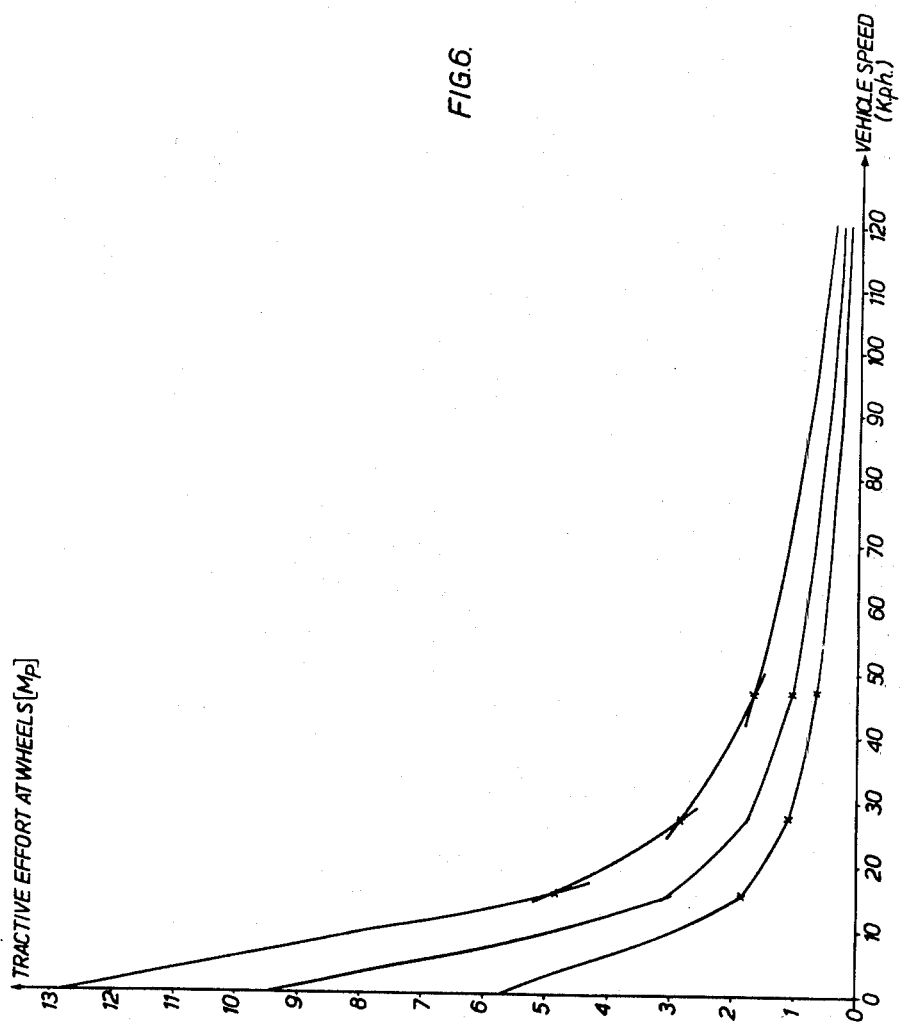

The transmission shown in FIG. 5 is particularly suitable for use with a single shaft gas turbine, the converters of FIG. 5 being four in number and arranged as shown in FIG. 10. Merely by connecting different numbers of torque converters or combinations thereof a number of load characteristics can be obtained at practically constant turbine speed as shown in FIG. 6.

In this case the single shaft turbine was of 370 h.p. at 2500 r.p.m. and the converters were of the S.R.M. C.F. type arranged two by two followed by a 2-speed gear. Two converters are geared for 100% output speed and the other two are geared for 59% output speed, that is 1.7 to 1. Each pair of converters includes one transferring 38% of maximum input torque and one transferring 62% so that together they absorb 100% of the maximum input torque. The curves in FIG. 7 show maximum and minimum tractive effort over the range of vehicle speed with different torque converters or torque converter combinations connected.

With this arrangment, for example, if one torque converter has a torque absorption of 33% and the diametrically disposed converter has a torque absorption of 66%, three input torque characteristics can be obtained by connecting the first converter or the second or both. In the illustrated arrangement two oppositely disposed converters are used for a first speed range, the two converters at right angles thereto for a second speed range and the gears thereof are combined with a forward/reverse gear and to produce sufficient performance for a large truck, either by adding a 2-speed gear or an overdrive, connected and disconnected by, for instance, an overcentred friction clutch to be shifted only when all torque converters are released. In this single shaft gas turbine it will be appreciated that direct drive cannot be used through torque converters.

The advantage of these designs result not only from the construction of the gears and gear box but also from the construction of releasable bladed components, which allows a number of torque converters to be disconnected without absorbing too high ventilation losses or friction losses which would have been the case with other types of releasable bladed components due to insufficient degrees of release.

Figure 7:
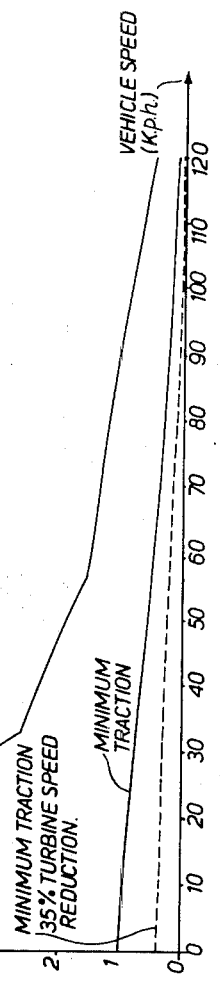

While FIG. 7 shows the maximum and minimum tractions within which at practically constant turbine speed the tractive effort can be varied, it is of course possible to obtain a desired operation below the minimum traction by connection and disconnection of the bladed components, which will only give the same feeling to a driver in a normal truck when using a speed regulated engine together with mechanical gear box and which is considered to be acceptable.

Figure 8:
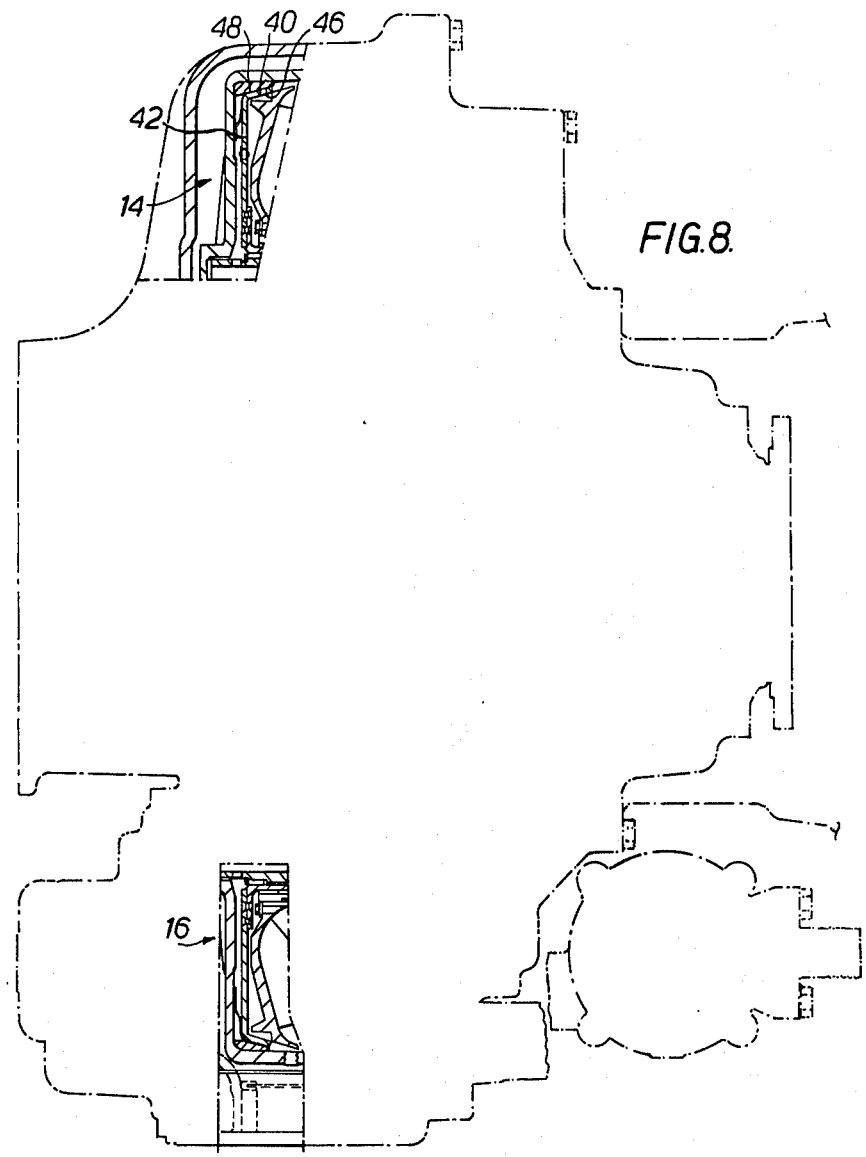

The transmission shown in FIG. 8 is the same as that shown in FIG. 5 with the exception that the torque converters in FIG. 8 are provided with lock-up clutches as shown and described in FIGS. 1 and 3, that is friction couplings between the rotating casing and the output shaft providing direct drive. This renders the transmission suitable for combination only with a two-shaft gas turbine or with a prime mover having its speed variable within a predetermined direct drive range.

Figure 9:
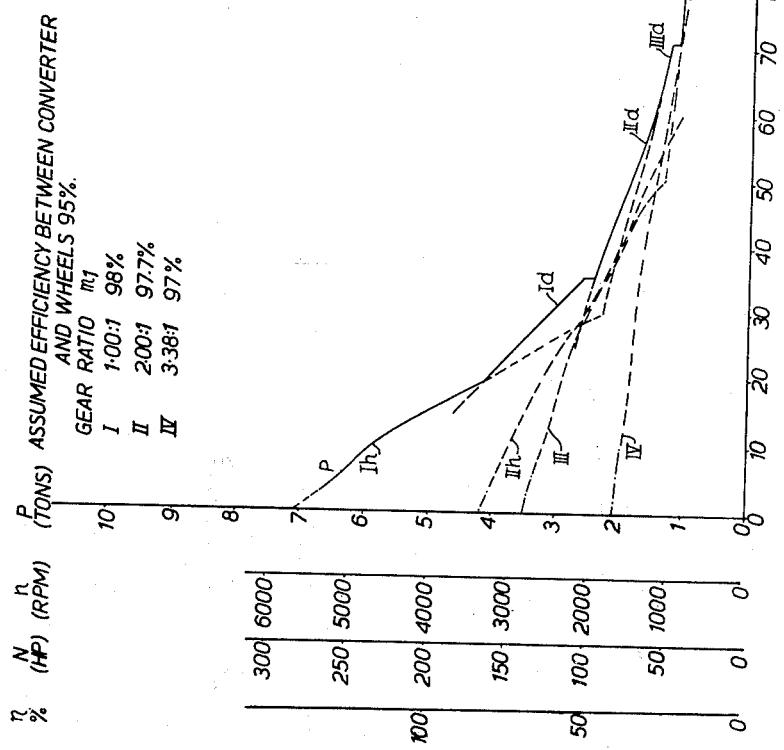

Performance characteristics of such an engine used for truck driving are shown in FIG. 9. These were obtained from the combination comprising a two-shaft gas turbine of 370 h.p. at 5500 r.p.m. coupled with a converter group of 4 converters arranged as shown in FIG. 10 each being of the type known as an S.R.M. DF 1½ stage (manufactured by the Assignee) and followed by a two speed gear box.

It will be clear that the gears may be operatively arranged in different manners and that the torque converters may be disposed differently as, for example, along a primary driving shaft which transfer torque to a counter shaft parallel to the primary shaft. Alternatively, the torque converters may be mounted in a star form using bevel gears.

What we claim is:

1. A hydrodynamic torque converter transmission comprising at least two hydrodynamic torque converter units connected in parallel between a main input shaft and a main output shaft, each torque converter including an input drive means in the form of a rotating casing drivingly connected to said main input shaft and forming therein a working chamber having therein a pump part including at least one ring of pump blades and a turbine part including at least one ring of turbine blades, output drive means including an output drive shaft drivingly engaged with the said main output shaft, first connecting means for engaging the pump part with the said rotating casing for rotation therewith, second connecting means for connecting the turbine part with the output drive means for rotation therewith, wherein in at least one of said torque converters, one of said first and second connecting means is completely releasable so that the part engaged thereat including all blades of that part, upon being released, is completely released so as to be rotatable relative to its respective said drive means, one of said releasable part and its drive means being a movable member movable axially relative to the other between a first position at which the connecting means connects that part to its respective drive means and a second position at which the connecting means is released, servomotor means for moving the movable member between said first and second positions, the releasable part being the piston of said servomotor such that a fluid pressure differential on opposite sides of said releasable part effects movement of said movable member between said first and second positions.

2. A transmission according to claim 1, wherein in said at least one torque converter the rotating casing is fixedly connected to the pump part, and said turbine part is the said releasable part.

3. A transmission according to claim 2, said at least one torque converter including a bladed guide member, said guide member being arranged to rotate or be held stationary.

4. A transmission according to claim 2, the turbine part being connectable to the output drive means through one friction surface on the turbine part and one friction surface on the output drive means.

5. A transmission according to claim 4, the output drive means including a flange extending radially from the output drive shaft and a part of the said rotating casing forming a servomotor for engaging one friction surface on the output drive means with one friction surface on the rotating casing for direct drive between the input drive means and the output drive means.

6. A transmission according to claim 1, which includes an arrangement comprising an assembly of four torque converters supported in diametrically opposed pairs around coaxial main input and output shafts with the central axes of the individual torque converters parallel to each other and means for selectively and respectively coupling together the said main input and main output shafts with the diametrically opposed pairs of torque converters and wherein at least one torque converter of each pair has a said releasable part.

7. A transmission according to claim 6, wherein all four torque converters have a said releasable part.

8. A transmission according to claim 7, including means for connecting at least one group of torque converters to drive the said main output shaft in a forward direction and means for connecting another group to drive said main output shaft in the reverse direction.

9. A transmission according to claim 7, including means for connecting at least one group of torque converters to drive the main output shaft at one maximum speed and means for connecting the other group of torque converters to the main output shaft to drive it at another maximum speed.

10. A transmission according to claim 7, including means for varying the torque absorption by the main input shaft by the simultaneous connection of different numbers of said torque converters.

11. A transmission according to claim 7, wherein the different torque converters have different torque absorption characteristics to enable closer variation of torque absorption of the main input shaft upon the connection of different numbers of torque converters.

12. A transmission according to claim 7, wherein the connection of the main input shaft to the input drive means includes a gear arrangement having one central gear connected to a driving source directly or through intermediate gears and driving the rotating casing of each torque converter, the main output shaft being coaxial with the main input shaft and driven by gears from the output drive shaft of each torque converter.

13. A transmission according to claim 12, wherein the gear ratios in the driving connection between the central shaft and the torque converters are different for different torque converters.

14. A transmission according to claim 1, wherein the torque converters include a lock-up clutch for direct drive between the input drive means and the output drive means.

15. A transmission according to claim 1, said main output shaft connected to a gear element having a dog clutch connection for forward and reverse.

16. A transmission according to claim 1, said main output shaft being connectable to a gear which is variable between two different gear ratios by means of an overcentred spring loaded friction coupling.

17. A transmission according to claim 1, said releasable bladed part being the pump part.

18. A transmission according to claim 17, which includes an arrangement comprising an assembly of four torque converters supported in diametrically opposed pairs around coaxial main input and output shafts with a central axes of the individual torque converters parallel to each other and means for selectively and respectively coupling together the said main input and the main output shafts with the diametrically opposed pairs of torque converters, and wherein all four torque converters have a releasable pump part.

19. A hydrodynamic torque converter transmission comprising four torque converters supported in diametrically opposed pairs around coaxial main input and output shafts with the central axes of the individual torque converters parallel to each other and means for selectively and respectively coupling together the said main input shaft and main output shafts with diametrically opposed pairs of torque converters, each torque converter including a bladed pump member and a bladed turbine member, an input drive means drivingly connecting the main input shaft to the pump member and an output drive means drivingly connecting the turbine member to the main output shaft, and wherein in at least one torque converter of each pair, one of said members is a releasable member, selectively connectable or releasable from its respective drive means to respectively transfer torque or interrupt torque transfer through that torque converter.

20. A transmission according to claim 19, wherein all four torque converters have a said releasable member.

21. A transmission according to claim 20, including means for connecting at least one group of torque converters to drive the said main output shaft in a forward direction and means for connecting another group to drive said main output shaft in the reverse direction.

22. A transmission according to claim 20, including means for connecting at least one group of torque converters to drive the main output shaft at one maximum speed and means for connecting the other group of torque converters to the main output shaft to drive it at another maximum speed.

23. A transmission according to claim 20, including means for varying the torque absorption by the main input shaft by the simultaneous connection of different numbers of said torque converters.

24. A transmission according to claim 20, wherein the different torque converters have different torque absorption characteristics to enable closer variation of torque absorption of the main input shaft upon the connection of different numbers of torque converters.

25. A transmission according to claim 20, said releasable member being the turbine part.

26. A transmission according to claim 20, said releasable member being the pump member.

* * * * *